April 23, 1963 YAT CHUEN YUEN 3,086,810
AUTOMOBILE CONSTRUCTION
Filed July 25, 1961 4 Sheets-Sheet 1

INVENTOR.
YAT CHUEN YUEN
BY
ATTORNEY

April 23, 1963 YAT CHUEN YUEN 3,086,810
AUTOMOBILE CONSTRUCTION
Filed July 25, 1961 4 Sheets-Sheet 2

INVENTOR.
YAT CHUEN YUEN
BY J. Ledermann
ATTORNEY

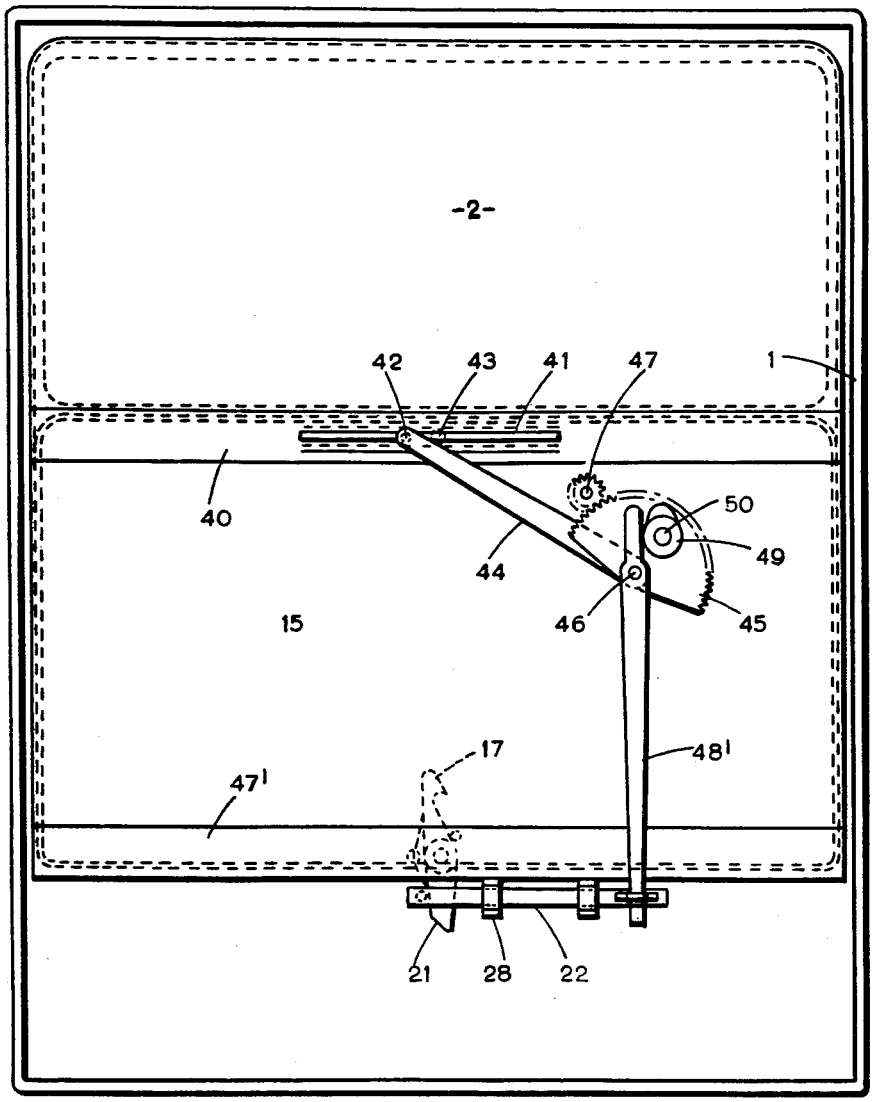

April 23, 1963     YAT CHUEN YUEN     3,086,810
AUTOMOBILE CONSTRUCTION
Filed July 25, 1961     4 Sheets-Sheet 4
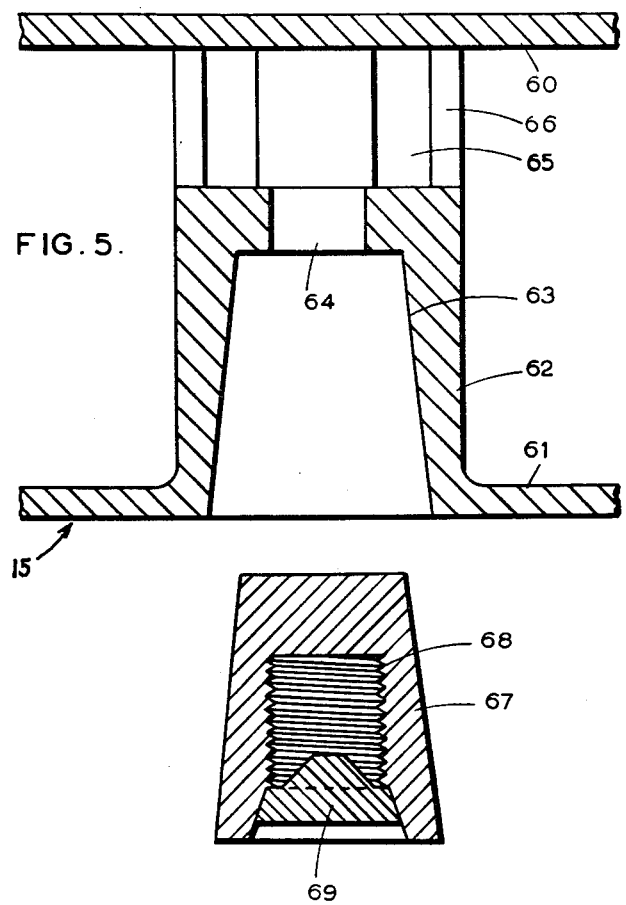
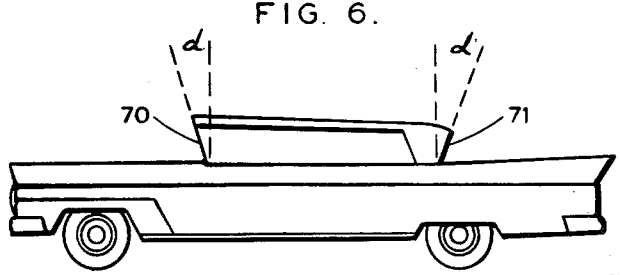
INVENTOR.
YAT CHUEN YUEN
BY
ATTORNEY

United States Patent Office 3,086,810
Patented Apr. 23, 1963

3,086,810
AUTOMOBILE CONSTRUCTION
Yat Chuen Yuen, 214A Des Voeux Road, Central,
Hong Kong
Filed July 25, 1961, Ser. No. 126,675
Claims priority, application Great Britain Nov. 2, 1960
2 Claims. (Cl. 296—44)

The present invention relates to an automobile construction. It will be understood that in climates where the normal outdoor temperature is very far removed from the comfort zone, being either much too hot or much too cold, the interior or passenger compartment of an automobile may require cooling or heating when the vehicle is left parked for any length of time. However, it is not economical to keep the engine running with a small load or to make use of the normal heating or cooling apparatus of the vehicle and to run this from the battery, as the power requirements are too high. Moreover, if the interior of the automobile requires heating this is normally done by means of waste heat from the engine or hot water from the radiator, neither of which is available when the car is stationary. Accordingly, it is an object of the present invention to provide a construction for an automobile wherein the interior does not suffer from extremes of climate to the same extent as in the case of the normal construction.

According to the present invention there is provided a construction for an automobile wherein the majority of the walls of the passenger compartment are insulated by means of heat insulating panels.

Preferably the panels are in the form of spaced sheets of transparent material such as glass or plastic, the sheets being sealed by rims or fitted with internal stays, the space between the sheets being evacuated of air or gases and the inner surfaces of the sheets being provided with a reflecting coating. In the case particularly of fixed windows, such as the windshield or the rear window, the window itself may be replaced by a heat insulating window. In the case of windows such as the side windows which are normally adapted to open, the opening of such windows can be used to control the bringing into position of a heat insulating panel, as will be made clear hereinafter.

If desired, the luggage compartment or deck, as well as the hood covering the engine, may be provided with heat insulating panels. In the case of heat insulating panels constructed as aforesaid and designed to replace or supplement conventional transparent windows, the silvering may be omitted or it may be reduced in extent, that is to say in thickness or in area, either to leave a clear space or to provide a semi-silvered surface which is nevertheless transparent. The fixed non-transparent parts of the automobile such as the roof, door panels, floors of the compartments and the like may be composed of heat insulating panels or the same may be lined therewith whilst the side windows and the front and rear windows may be of double construction arranged so that a heat insulating panel may slide between two sheets or skins thereof.

The above broad as well as additional and more specific objects will be clarified in the following description wherein reference numerals refer to like-numbered parts in the accompanying drawings. It is to be noted that the drawings are intended primarily for the purpose of illustration and that it is therefore neither desired nor intended to limit the invention necessarily to any or all of the exact details of construction shown or described except insofar as they may be deemed essential to the invention.

Referring briefly to the drawing,

FIG. 3 is a view similar to FIG. 1 but of a modified embodiment.

FIG. 5 is an exploded longitudinal sectional view of a portion of one of the insulating panels, illustrating a means which enables evacuating of the panel.

FIG. 6 is a diagrammatic side elevational view of an automobile, showing further modifications of the latter.

Before proceeding with a detailed description of the invention with reference to the drawings, it is believed preferable to deal first with the opaque portions of an automobile such as the roof, door panels, engine hood and the like. These opaque portions are all provided with heat insulating panels of some suitable construction, and very desirably the panels are made of glass or transparent plastic in accordance with my co-pending application Serial No. 2,663, filed January 15, 1960, now abandoned. Thus, the panels may comprise a substantially flat rectangular hollow air-tight structure from the interior of which the air has been exhausted to create a vacuum and the internal surfaces of which are preferably silvered or coated with other suitable material. The panels preferably include strengthening and spacing members, webs or the like which may also serve to house fixing screws or the like. The panels may conveniently be in the form of two plates, at least one of which is provided with a rim, and the webs extending between the two plates may be counter-bored to receive the fixing bolts, and when the two plates have been assembled together the air may be withdrawn through a device such as illustrated in FIG. 5.

The front and rear windows of the automobile are, of course, fixed in the normal construction and they may be replaced, in accordance with the present invention, by a transparent heat insulating panel. Alternatively the heat insulating panel, designed for location in the front and rear windows, may normally be housed out of sight to be brought into position by suitable means such as hydraulic rams or the like, in which case the heat insulating panels may, of course, be opaque. It is very convenient to make use of a double transparent skin construction for such windows so that the heat insulating panel may slide between the two transparent skins.

Figure 1:
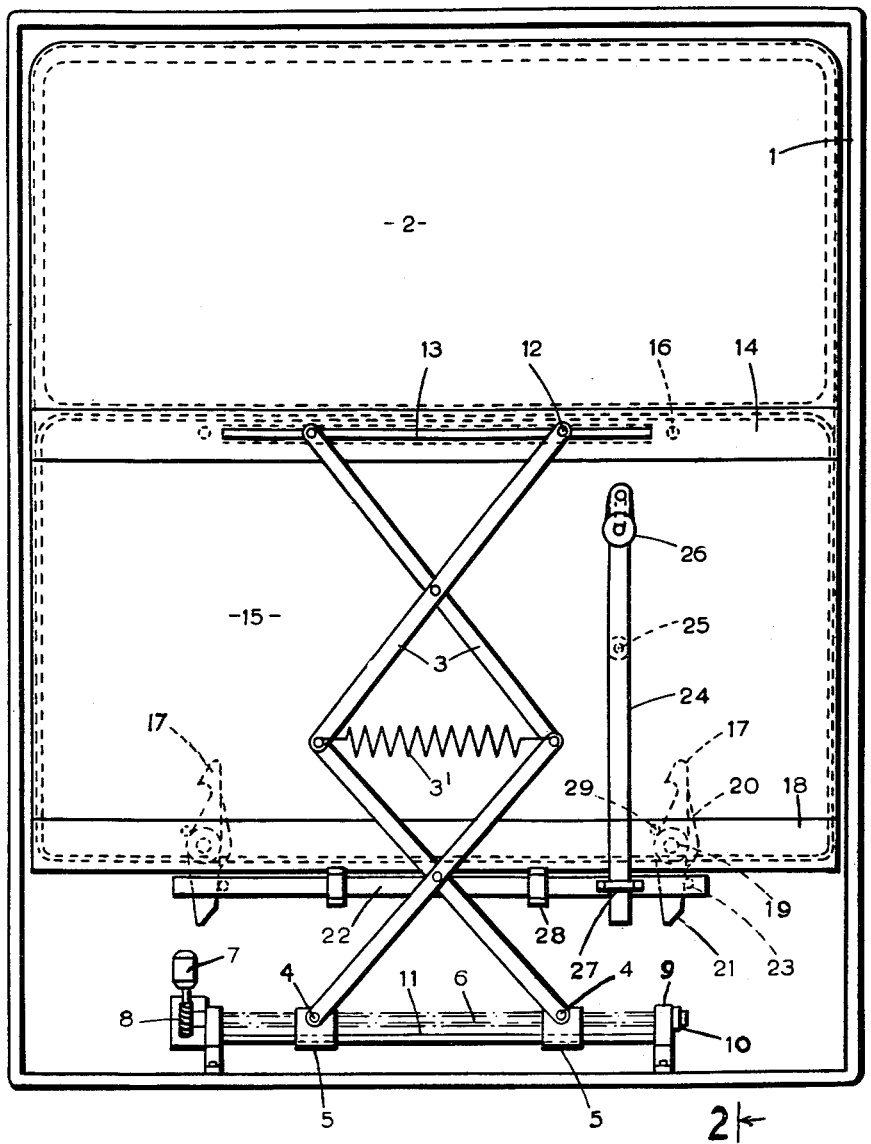
FIG. 1 is an elevational view, with parts broken away and partly in section, of a door and window panel for an automobile.
Figure 2:
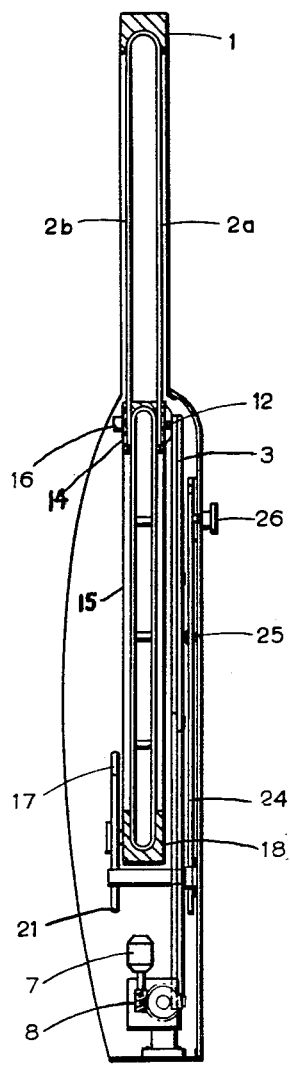
FIG. 2 is a sectional view taken on the line 2—2 of FIG. 1, with parts omitted.

In the case of the side windows which are normally designed to open, the construction shown in the drawings is very convenient. Referring now in detail to the drawings, and in particular to FIGS. 1 and 2, the door and window frame unit is shown generally by the numeral 1, and the numeral 2 designates the slide window per se. Unlike the conventional window in an automobile, the window 2 is hollow and consists of two parallel sheets or plates of transparent material 2a and 2b (FIGS. 2 and 4) which are spaced apart and joined along their two side edges and their top edges so as to form an envelope or pocket open only at its bottom. The window 2 is moved up and down so as to open or close the window space or opening, by means of a lazy tongs arrangement 3 which has its lower ends journalled by pivot pins 4 to two nuts 5 located upon a screw threaded rod 6 (shown in phantom), this rod having right- and left-hand screw threads, not shown, at its ends. The rod 6 is rotated in either direction as may be necessary by means of an electric motor 7 driving through a worm and pinion 8, the rod itself being mounted in suitable journals 9 secured to the door frame 1 and being retained in the journals by a collar 10. In order to restrain the nuts 5 from rotation about the rod 6 as the latter is turned, a bar 11 is located parallel to the rod 6 and the nuts 5 have bores engaging with such bar 11.

At its upper end, the lazy tongs 3 carries pins 12 which slide in a channel section member 13 secured to a rectangular bracing 14 which in turn carries the window 2. It will be understood that the construction is such that rotation of the motor 7 in one direction or the other will cause the nuts 5 to approach or separate from, each other and will therefore cause the lazy tongs 3 to increase or decrease in length. This increase or decrease in length will have the effect of moving the window 2 up or down.

Also located within the door frame is a hollow heat insulating panel 15 which is so dimensioned as to be capable of entry into the interior of the window 2, this entry taking place automatically as the window is lowered. If it is desired that when the window is raised the heat insulating panel 15 should also rise, then this is effected by means of studs 16 on the frame 14 which automatically engage with hook fingers 17 mounted upon a lower rectangular trough 18 for the heat insulating panel 15. These fingers 17 are mounted on pivot pins 19 and are urged by springs 20 into the position in which they engage the studs 16. Thus as the window is lowered the studs 16 engage with the hooks 17 so that when the window is raised the heat insulating panel 15 travels with it.

However, it will be apparent that occasionally it will be desired to raise the window without at the same time raising the heat insulating panel and to this end the fingers 17 have tails 21 extending upon the opposite side of the pivot pins 19, such tails being located in proximity to a sliding bar 22 which is provided with studs 23 to engage the tails 21. A control rod 24 for the sliding bar 22 is provided and is pivoted to a suitable portion of the door frame at 25. This rod has a knob 26 at its upper end and its lower end is engaged in a stirrup 27 attached to the bar 22, the latter being mounted in runners 28 with the stirrup loosely engaging the rod 24 so that as the rod is swung to one side or the other about its pivot the bar 22 is moved to right or left. Consequently, in order to disengage the hook fingers 17 from the studs 16 it is merely necessary to move the knob 26 to the right, FIG. 1, thus sliding the bar 22 to the left and moving the hook fingers 17 to the right. As soon as the knob is turned back after the window has been raised the springs 20 will reassert themselves to move the fingers 17 into the position shown, where they are stopped by fixed stops 29. The knob 26 can be at a fixed position after being turned to the right. In such a position the hooks 17 stay always at the right to let the window go up and down without engagement until the knob 26 is turned back to its normal position. To reduce the power required for raising the windows a contracting spring 3' can be connected between the middle joints of the lazy tongs.

Figure 4:
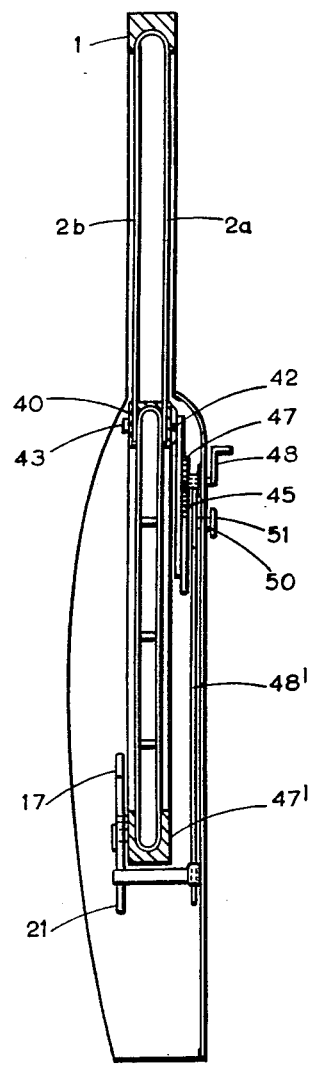
FIG. 4 is a sectional view taken on the line 4—4 of FIG. 3, with parts omitted.

The embodiment illustrated in FIGS. 3 and 4 is very similar to that of FIGS. 1 and 2, except that it relates to a manually operated window. Once more, the conventional door frame 1 is provided together with the window 2 therein, this window being slidable in guides and being mounted upon a bottom frame 40 which is provided on one side with a channel guide 41 in which is located a sliding headed pin 42, the other side of the frame carrying a stud 43. The pin 42 is mounted upon the end of a radius arm 44 which is securely fixed to a sector gear 45 mounted upon a pivot pin 46 and engaged by a pinion 47 to which is connected a crank 48. It will be apparent that turning of the hand crank 48 will cause rotation of the sector gear 45 and consequently movement of the radius arm 44 to raise or lower the window, this being a conventional arrangement.

To reduce the power required for raising the window a spiral spring, not shown, may be fitted to the sector gear 45 so as to be energized during descent of the window. In order to retain the window in the raised position, i.e., to prevent it from sliding downwards after it has been raised, a spiral spring stopper box, not shown, is fitted in the conventional manner to the pinion 47 and is arranged to be energized during raising of the window.

The heat insulating panel 15 is carried in a lower channel frame member 47' and pivotally mounted upon one side of the member 47' is a hook finger similar to the hook fingers 17 of FIG. 1. However, in contradistinction to the embodiment of FIGS. 1 and 2, only one such hook finger is provided and it is aligned to cooperate with the fixed stud 43 on the other side of the member 40. Here also the tail 21 of the finger 17 is engaged by a sliding bar 22 located in stirrups 28 secured to the door frame 1 and this sliding bar 22 is operated by a control rod 48' pivoted upon the pivot pin 46 and having an extension which is engaged by a cam 49 mounted for turning on a pin 50 and having a flat knob 51 so that rotation of the knob 51 causes the cam portion to engage the upper part of the rod 48' above the pivot pin 46 to rotate the same slightly and cause the bar 22 to slide longitudinally.

If desired, the hollow windows previously described may be treated with a very thin silver coating so as to provide some measure of heat reflecting and transparent properties.

The device illustrated in FIG. 5 may very conveniently be used for withdrawal of the air from the hollow panels 15. It will be seen from FIG. 5 that the panels 15 comprise front and back sheets 60, 61 respectively and that the back sheet 61 is provided on its inner surface with a boss 62 which has a conical counter-bore 63, and at the base of the counter-bore is a hole 64. Beyond the base of the boss 62 is a hollow cylindrical boss portion 65 which is provided with apertures 66 in its wall so that the conical counter-bore 63 communicates with the interior of the panel through the hole 64 and the apertures 66. In order to evacuate the air from the space between the sheets, a conical plug 67 is inserted loosely in the bore 63 and then a suction device is applied to the exterior of the wall 61 to draw the air from within the panel. When the panel is evacuated, the plug 67 is pushed home so as to seat against the conical wall of the counter-bore and against the base of the counter-bore, being held in position by atmospheric pressure. The plug 67 has a screw threaded counter-bore 68 into which a suitable threaded plug 69 may be inserted, as indicated, in order to seal the bore and withdraw the plug 67 if necessary.

As shown in FIG. 6, the front and rear windows may be set at an angle "d" of about twenty degrees to the vertical, the top edge of the front window 70 being inclined forwardly, and the top edge of the rear window 71 being inclined rearwardly, the arrangement being such that the rays from the sun or from a light beam which impinge on the windows are reflected downwardly to the front or rear of the vehicle and are not troublesome to other road users.

In a modified construction of the front and rear windows, not shown, the heat insulating panel is eliminated, and each window comprises two skins adhesively secured together with a very thin layer of silver or the like between them on one or both of their inner surfaces, the thickness of such silver layer being such that the window remains transparent. The outer skin may be made of glass and the inner skin may be made of transparent synthetic plastic, or both skins may be made of one of the said materials.

The invention having thus been described, what is claimed and desired to be secured by Letters Patent is as follows:

1. A construction for an automobile having walls surrounding the passenger compartment thereof and a plurality of transparent windows in said walls normally occupying elevated window openings in the wall, at least one of said windows being hollow and composed of two spaced parallel plates sealed around their top and side edges to provide a pocket open at the bottom, a heat insulating panel dimensioned to register within said pocket and normally positioned below the window opening in the plane of said pocket, means for raising the hollow window into the window opening and for lowering the same below the window opening, releasable means for locking the panel to the hollow window comprising at least one hook pivotally mounted on the lower edge of said panel, a stud secured to the lower edge of the hollow window, and means for swinging the hook into engagement with the stud when the hollow window is positioned below the window opening.

2. A construction according to claim 1, said means for swinging the hook comprising a spring normally urging the hook into engagement with the stud, and additional means for swinging the hook out of engagement with the stud against the force of said spring for raising or lowering the hollow window alone without the panel.

References Cited in the file of this patent
UNITED STATES PATENTS

| | | |
|---|---|---|
| 620,296 | Fleming | Feb. 28, 1899 |
| 1,124,778 | Meuler | Jan. 12, 1915 |
| 2,405,423 | Hayes | Aug. 6, 1946 |
| 2,569,955 | Schassberger | Oct. 2, 1951 |
| 2,683,906 | Nevins | July 20, 1954 |
| 2,745,150 | Warns | May 15, 1956 |
| 2,803,492 | Wright | Aug. 20, 1957 |
| 2,828,999 | Schamel | Apr. 1, 1958 |
| 2,924,485 | Miles | Feb. 9, 1960 |